R. A. NORTON.
STREET SURFACE BOX, MANHOLE, INSPECTION CHAMBER, AND THE LIKE.
APPLICATION FILED NOV. 12, 1914.

1,181,403.

Patented May 2, 1916.
2 SHEETS—SHEET 1.

WITNESSES:
John C. Sanders
Dudley D. Howard

INVENTOR
Ralph Arthur Norton

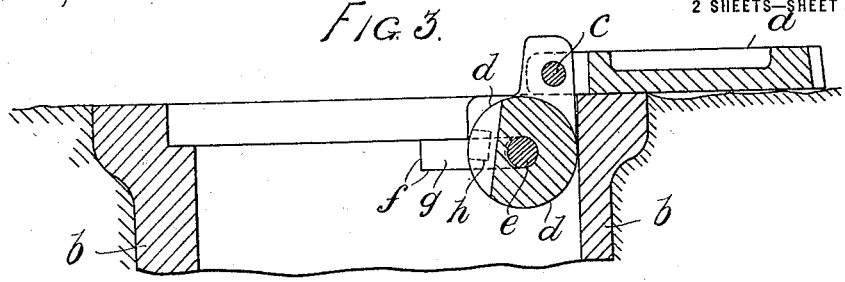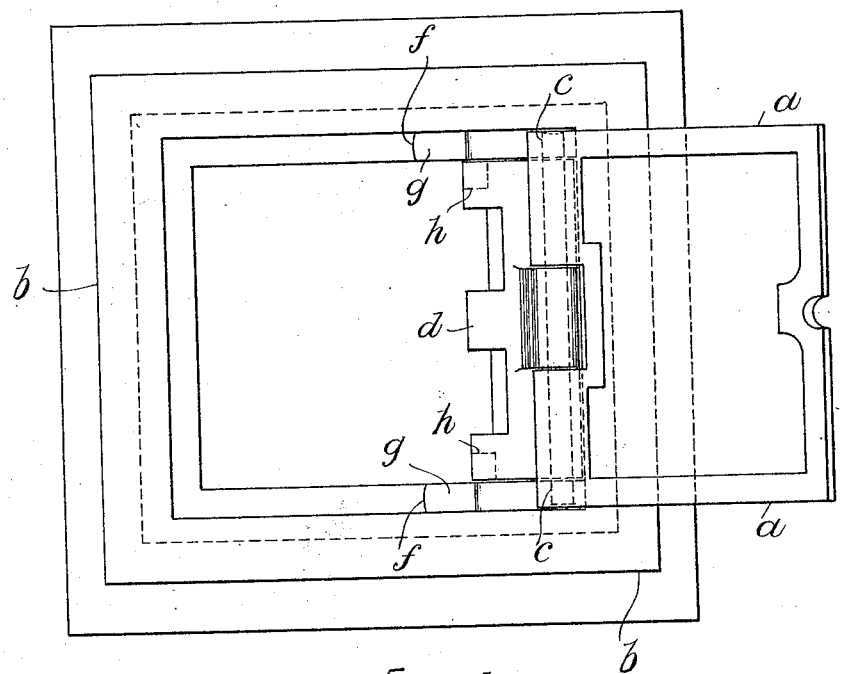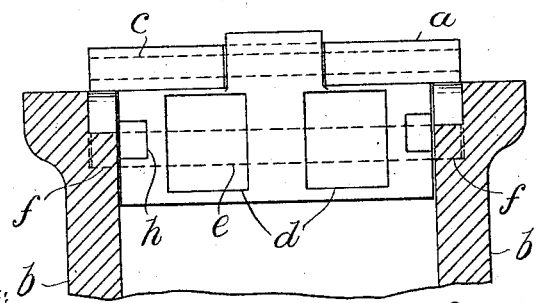

UNITED STATES PATENT OFFICE.

RALPH ARTHUR NORTON, OF NEWCASTLE-UPON-TYNE, ENGLAND.

STREET SURFACE BOX, MANHOLE, INSPECTION-CHAMBER, AND THE LIKE.

1,181,403.  Specification of Letters Patent.  Patented May 2, 1916.

Application filed November 12, 1914.  Serial No. 871,718.

*To all whom it may concern:*

Be it known that I, RALPH ARTHUR NORTON, a subject of the King of Great Britain and Ireland, residing at 15 Queen's Terrace, Jesmond, in the city and county of Newcastle-upon-Tyne, England, have invented new and useful Improvements in or Relating to Street Surface Boxes, Manholes, Inspection-Chambers, and the like, of which the following is a specification.

This invention relates to street surface-boxes, manholes, inspection chambers and the like and has special reference to those provided with heavy hinged covers, and the invention has for its object to provide improved means of pivoting the cover to the frame of the box or the like.

According to this invention instead of pivoting the cover or lid directly in or to the frame of the box or the like, I pivot it to a lug or the like which is itself pivoted to the frame.

I will fully describe the invention with reference to the accompanying drawings wherein—

Figure 1:
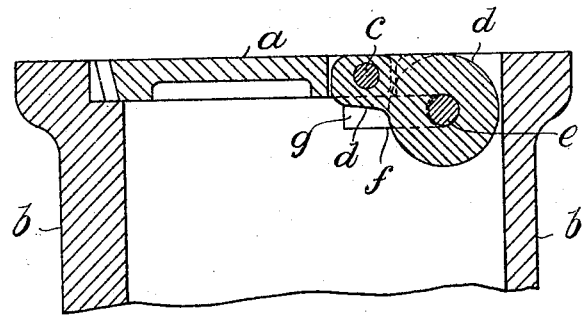
Figure 2:
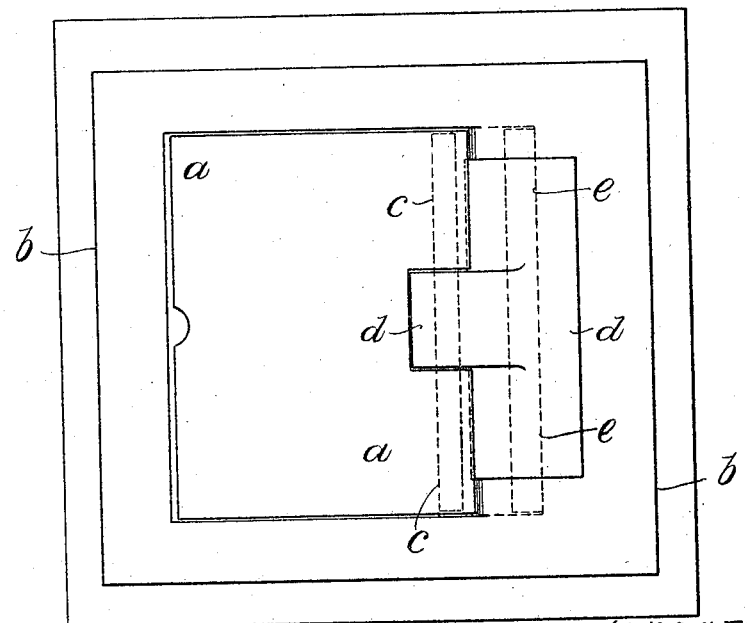

Figure 1 is a longitudinal section and Fig. 2 a plan of one form of box embodying my improvements, the lid or cover of the box being closed. Fig. 3 is a part longitudinal section, Fig. 4 a plan of same and Fig. 5 a part transverse section of the box with the lid or cover open.

Referring to the drawings, the cover $a$ of the box or the like $b$ has hinged to it, by a pin $c$, a lug $d$ which in turn is hinged to the frame of the box, or the like by a pin $e$. With this arrangement of hinge the cover $a$ when raised or opened can be turned right back as shown in Figs. 3, 4 and 5, to rest on the ground, thus relieving the hinge pins $c$ and $e$ of its weight, and also affording unobstructed access to the interior of the box or the like. Preferably the hinge pin $e$ is loosely mounted in the lug $d$ and the ends of the pin engage slots $f$ in the sides of the box frame, said slots being provided with gaps in their upper walls for the insertion and withdrawal of the ends of the hinge pin, which are retained in the slots by laterally fitted and removable locking or filling blocks $g$ to lock the lug $d$ and cover $a$ against inadvertent removal from the frame, as described in the specification of my previous Patent No. 1,105,826 of 1914. Recesses $h$ may be provided at the sides of the lug $d$, which recesses, when turned into horizontal or transverse alinement with the slots $f$, facilitate the fitting and removal of the locking or filling blocks $g$. As will be obvious, instead of the lug $d$ being fitted with a loose through hinge pin $e$ it may be provided with a separate pin or pivot at each side.

Having thus described my invention, what I claim as new and desire to secure by Letters Patent is:—

1. In a surface-box, manhole, inspection chamber or the like, the combination of a frame, a cover, said frame having slots therein of regular contour, pivot means removably supporting the cover in the frame and engaged with the slots, and blocks of regular contour engaged in the slots to engage said pivot means to confine the latter in the slots and prevent accidental displacement thereof, the part engaged by the pivot means for attaching the cover thereto having end recesses adapted to be placed in alinement with the slots to facilitate application and removal of the blocks.

2. In a surface-box, man-hole, inspection chamber or the like, the combination of a frame; a cover; a lug to which said cover is pivoted; a hinge pin loosely mounted in said lug; slots provided on the inside of said frame for the reception of the ends of said hinge pins; removable locking blocks for closing said slots to confine the ends of said hinge pin therein and thereby lock said lug and cover against inadvertent removal from the frame, said locking blocks being capable of fitment and removal only when said cover is open; and recesses in said lug for facilitating the fitting and removal of said locking blocks.

3. In a surface box, manhole, inspection chamber or the like, a frame constituting an inclosure, said frame having opposed slots therein, a lug having pivot means engaged in said slots, means removably engaged in the slots to retain said pivot means from displacement and a cover pivoted to the lug to jointly cover the frame in conjunction with the lug when in closed position with the lug normally lying within the frame, said lug being movable in the frame on its pivot means independently of the movement of the cover and adapting said cover to be opened at right angles thereto on a plane coincident with the plane of the edge of the frame and contacting with the ground surface or support to which the same is applied, throughout the contacting face of the cover.

4. In a surface box, manhole, inspection chamber or the like, the combination with a frame and a cover; of a circular lug pivoted to the frame adjacent one wall thereof and having the cover pivoted thereto, said cover and lug being provided with interlocking portions forming a complete closure when in covering position, said lug being turnable in the frame in a fixed arc whereby to dispose the interlocking portions thereof outwardly of the frame adjacent one side of the latter when the cover is opened by independent pivotal movement with respect to the lug and simultaneously with the pivoting of the latter, said connection of the cover with the lug and frame causing said cover to be supported on a true horizontal plane and in an inverted position upon the frame and part to which the latter is applied, when the cover is opened.

In testimony whereof I have signed my name to this specification in the presence of two subscribing witnesses.

RALPH ARTHUR NORTON.

Witnesses:
H. NIXON,
G. LISH MANGHAN.

Copies of this patent may be obtained for five cents each, by addressing the "Commissioner of Patents, Washington, D. C."